(12) United States Patent
Hollahan (10) Patent No.: US 10,758,979 B2
(45) Date of Patent: Sep. 1, 2020

(54) RECOATING DEVICE FOR ADDITIVE MANUFACTURING

(71) Applicant: Xact Metal, Inc., State College, PA (US)

(72) Inventor: Jonathon Lee Hollahan, State College, PA (US)

(73) Assignee: XACT METAL, INC., State College, PA (US)

( * ) Notice: Subject to any disclaimer, the term of this patent is extended or adjusted under 35 U.S.C. 154(b) by 340 days.

(21) Appl. No.: 15/665,603

(22) Filed: Aug. 1, 2017

(65) Prior Publication Data

US 2019/0039135 A1 Feb. 7, 2019

(51) Int. Cl.
| | | |
|---|---|---|
| *B33Y 30/00* | (2015.01) | |
| *B22F 3/105* | (2006.01) | |
| *B29C 64/205* | (2017.01) | |
| *B29C 64/124* | (2017.01) | |
| *B29C 64/153* | (2017.01) | |
| *B29C 64/165* | (2017.01) | |
| *B33Y 10/00* | (2015.01) | |

(52) U.S. Cl.
CPC .......... *B22F 3/1055* (2013.01); *B29C 64/124* (2017.08); *B29C 64/205* (2017.08); *B33Y 30/00* (2014.12); *B22F 2003/1056* (2013.01); *B29C 64/153* (2017.08); *B29C 64/165* (2017.08); *B33Y 10/00* (2014.12)

(58) Field of Classification Search
CPC ................................ B33Y 30/00; B33Y 10/00
See application file for complete search history.

(56) References Cited

U.S. PATENT DOCUMENTS

| | | | |
|---|---|---|---|
| 6,764,636 B1 | 7/2004 | Allanic et al. | |
| 2002/0152002 A1 | 10/2002 | Lindemann et al. | |
| 2007/0075458 A1* | 4/2007 | Wahlstrom | B22F 3/008 |
| | | | 264/401 |

FOREIGN PATENT DOCUMENTS

| | | |
|---|---|---|
| EP | 1769902 A2 | 4/2007 |
| NL | 2013862 B1 | 11/2014 |

OTHER PUBLICATIONS

PCT International Search Report and Written Opinion for International Application Serial No. PCT/EP2018/070613, dated Oct. 17, 2018, pp. 1-15.

* cited by examiner

*Primary Examiner* — Scott R Kastler
(74) *Attorney, Agent, or Firm* — Tarolli, Sundheim, Covell & Tummino LLP (57) ABSTRACT

We disclose herein a recoating device for an additive manufacturing process, the device comprising: a recoating member for guiding a volume of material to a target area and a support structure on which the recoating member is mounted. The recoating device is configured such that the recoating member moves in a first direction along a longitude of the target area and the recoating member moves in a second direction different to the first direction.

17 Claims, 9 Drawing Sheets

RECOATING DEVICE FOR ADDITIVE MANUFACTURING

FIELD OF THE INVENTION

The present invention relates to a recoating device for an additive manufacturing process.

BACKGROUND TO THE INVENTION

Additive Manufacturing (AM) can be used to create complex parts quickly and efficiently. In the field of AM, Selective Laser Melting (SLM) is a type of Powder Bed Fusion (PBF) process that can be used to fuse metal powder particles together, layer by layer, to build fully-dense metal parts. An SLM system is typically comprised of a build piston, a feed cylinder, a wiper/recoating mechanism, and a high powered laser scanner.

Similarly, Selective Laser Sintering (SLS) is a method of AM wherein layers of powder are selectively sintered and parts are produced by applying powder to sintered layers. This has the disadvantage that it cannot be used to make metal components that withstand high temperatures and high stress.

In both SLM and SLS systems, a recoating mechanism is typically used to coat the build plate of the system with the powder to be fused. There are generally two methods of coating the build plate with the powder: using a recoater to push powder from a feed cylinder over to a build cylinder, or using a recoater that is fed powder though a hopper.

U.S. Pat. No. 6,764,636 describes a recoater mechanism using an elongated blade with an axis of rotation such that it can roll over the powder when recoating.

Existing recoater mechanisms are rigidly mounted and move along a single axis. If they interfere with a distorted part, then either the part or the recoater blade can be damaged. This results in the build process failing and the recoater blade having to be replaced. Additionally, recoater mechanisms that are fixed in the vertical direction do not allow for any adjustment on the user end.

Many existing recoater devices do not have a simple way of replacing the recoater blade. In many devices the recoater blade has to be slid out of a slot, this is difficult and time consuming as a rubber blade will have a high coefficient of friction.

SUMMARY

According to one aspect of the present invention, there is provided a recoating device for an additive manufacturing process, the device comprising: a recoating member for guiding a volume of material to a target area; a support structure on which the recoating member is mounted; wherein the recoating device is configured such that the recoating member and the support structure move in a first direction along a longitude of the target area and the recoating member and the support structure are capable of moving in a second direction different to the first direction. The recoating member is capable of moving in the second direction at the same time of moving in the second direction. The recoating member and support structure generally move in the second direction to achieve a deflection effect. The movement in the second direction can generally be a transient movement as it can move at the same time of the movement in the first direction.

The arrangement of the device allows the recoater mechanism to add incrementing layers of material to a target area. This may be accomplished by pushing material from a feed and spreading it over the target area and progressive layers that are accumulated during the build process.

The second direction that the recoating member generally moves in may be perpendicular to the first direction. The second direction may not be an opposite direction to the first direction. As the recoating member may move in the second direction this advantageously enables the recoating member to deflect on a deformed part being formed and recover.

The volume of material may comprise of a powder. However, alternatively it may comprise of a fluid.

The recoater may move across the target area in a linear or a circular motion.

The recoating member may move in the second direction when the recoating member pivots about an axis along the first direction. This allows the recoater member to deflect around deformed parts of various shapes and recover accordingly. The deflection technique/mechanism avoids the recoating member, and the part being formed, from being damaged. This also has the advantage that the height of the recoating member may be adjusted as necessary/suitable.

Additionally, the recoating member may move in the second direction when the recoating member pivots about an axis transverse to the first direction. This allows the recoater member to deflect around deformed parts of various shapes and recover accordingly.

As the recoater member can pivot about different axes, this increases reliability of the device.

The recoating device may further comprise a recoater base coupled with the support structure. Preferably, the support structure may comprise a structure with two legs coupled with a base. This may form a bridge structure.

The recoating device may further comprise at least one biasing component coupled between the recoater base and the support structure.

The biasing component may be located centrally along the recoater base. This allows for the recoating member to deflect in one direction. Alternatively the biasing component may be position at any suitable point to allow deflection of the recoating member.

Preferably, the recoating device may further comprise at least one biasing component located at each end of the support structure and coupled between the recoater base and the support structure. This permits the two ends of the support structure to deflect independently, allowing the recoating member to pivot about an axis. Preferably, the recoating device may further comprise at least four biasing components such that the recoating member can pivot about two separate axes. This has the advantage that the recoating member may deflect deformations of many shapes.

Preferably, the at least one biasing component may be a compression spring. Alternatively, the biasing component may be another type of suitable biasing component. The biasing component may be another type of spring.

The recoating device may further comprise at least one adjustable fixing component at each end of the support structure, the at least one adjustable fixing component each being coupled between the recoater base and the support structure.

The height of the recoating member in relation to the target area may be adjustable by the at least one fixing component. This has the advantage of allowing for a wider range of different layer thicknesses. This also has the advantage that the recoating member can be aligned as necessary with the target area.

Preferably, the at least one fixing component may be a height adjustment screw. The adjustment screws may be fine-thread adjustment screws. The adjustment screws may be finger-adjusted or adjusted using hex keys to allow for extremely fine adjustment. Alternatively, the at least one fixing component may be another type of fixing component.

One end of the recoating member may be raised or lowered independently to another end of the recoating member. This has the advantage that the recoating member can be further adjusted to be aligned as necessary at different angles.

The recoating member may be a recoater bulb or a recoater blade.

The recoating device may further comprise a plurality of longitudinal rails, wherein the recoating member may be movable along the plurality of longitudinal rails in the first direction. Generally speaking the recoating device may comprise two longitudinal rails.

The recoating device may further comprise: a recoating member holder; and a recoating member clamp; wherein edges of the recoating member are fixed between the recoating member holder and the recoating member clamp.

The recoating member clamp may be detachable from the recoating member holder. This has the advantage that removal of the recoating member is not affected by the high coefficient of friction of the recoating member, as the recoating member does not have to be slid in and out. Additionally, the recoating device does not need to be taken out to access the recoating member, instead only the recoating member clamp needs to be moved to access the recoating member.

The recoating member clamp may be detachable from the recoating member holder by the removal of one or more screws. Preferably the recoating member clamp is detachable using six screws. Alternatively, the recoating member may be detachable using more or less than six screws. This has the advantage that the recoating member clamp can be removed and the bulb can be replaced. The recoating member clamp can then be reinstalled by replacing the screws. This allows the bulb to be easily changed. This allows the recoater mechanism to be mounted on the lid of the additive manufacturing machine in order to access the screws.

The recoating member clamp may be mounted onto the recoating member holder using a hinge. Preferably the hinge is operable by the removal of one or more screws. This allows the recoating member clamp to swing open on the removal of the screws. Therefore the recoating member clamp does not have to be completely removed. The recoating member (bulb) can then be replaced. The recoating member clamp can then be reinstalled by replacing the screws. This allows the recoating member (bulb) to be changed easily and quickly.

Preferably, the recoater member may comprise rubber or plastic. Any suitable types of rubber or plastic can be used.

According to a further aspect of the present invention, there is provided a recoating device for an additive manufacturing process, the device comprising: a recoating member for guiding a volume of material to a target area; a support structure on which the recoating member is mounted; a recoater base coupled with the support structure; at least one biasing component coupled between the recoater base and the support structure, and wherein the recoating member is configured to move in a first direction along a longitude of the target area, and wherein the at least one biasing component is configured to move the recoating member in a second direction different to the first direction.

According to the present invention, there is provided a three dimensional (3D) printer comprising the recoating device described above.

According to a further aspect of the present invention there is provided a method of manufacturing a recoating device for an additive manufacturing process, the method comprising: forming a recoating member for guiding a volume of material to a target area; forming a support structure on which the recoating member is mounted; wherein the recoating member moves in a first direction along a longitude of the target area and the recoating member moves in a second direction different to the first direction.

BRIEF DESCRIPTION OF THE DRAWINGS

Some preferred embodiments of the invention will now be described by way of an example only and with reference to the accompanying drawings, in which.

DETAILED DESCRIPTION OF THE PREFERRED EMBODIMENTS

Figure 1:
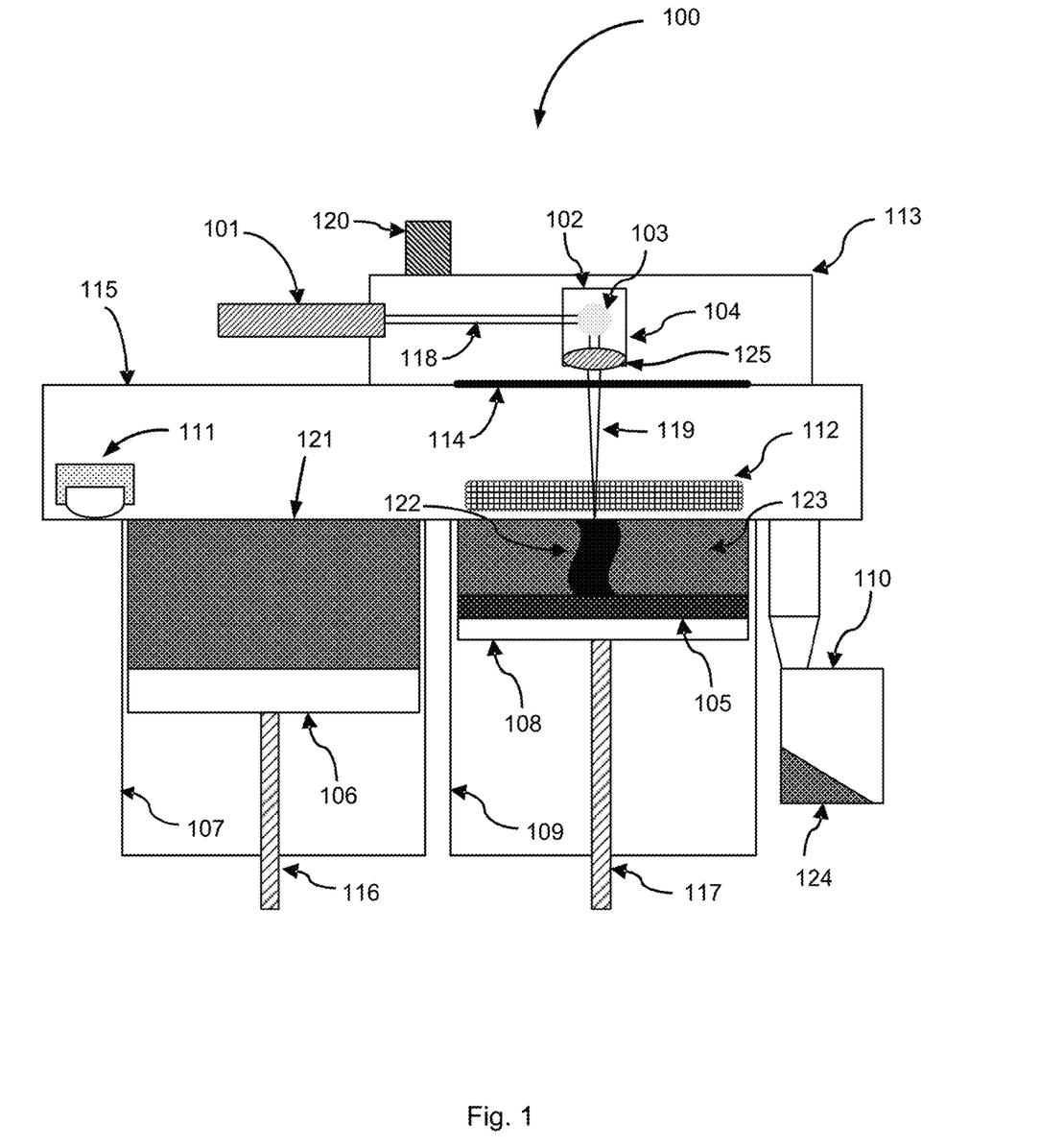
FIG. 1 is a schematic representation of an exemplary SLM device, incorporating a recoater mechanism.

FIG. 1 is a schematic representation of an exemplary SLM device, incorporating a recoater mechanism. Various components of an SLM machine are listed below using the reference numerals used in the figure:

100) AM machine
101) Collimated light source
102) Primary mirror
103) Secondary mirror
104) Scan head
105) Removable build plate
106) Feed platform
107) Feed cylinder
108) Build platform
109) Build cylinder
110) Catch bin 111) Coating mechanism
112) Ventilation manifold
113) Optical enclosure
114) Optically transparent window
115) Build chamber enclosure
116) Feeder linearly actuated screw
117) Build linearly actuated screw
118) Collimated beam
119) Focused beam
120) Scanner drive motors
121) Feedstock powder
122) Solidified 3D part
123) Unfused powder bed
124) Overflow powder
125) Focal lens The machine 100 comprises a feeder (not shown) that can be used to deliver feedstock powder 121 to the process. The feeder device comprises of a feed cylinder 107, a feed platform 106, and a feeder linearly actuated screw 116. The parts that are to be built are built on a removable build plate 105 located upon the build platform 108. The build plate 105 is a flat two-dimensional plate used as a stage to build the parts on. The build platform 108 is housed within a build cylinder 109. The build cylinder 109 comprises an extruded shape that compliments the external dimensions of the build platform 108. The build cylinder 109 provides a barrier for the unused feedstock powder while the build process is taking place. The build platform 108 is located on the build linearly actuated screw 117. This screw 117 adjusts the height of the build platform 108. In this example, the build platform and build plate form part of the structure in which the target area for 3D printing is formed.

The feed platform 106 and build platform 108 are located in the hermetically sealed build chamber enclosure 115. At one end of the build chamber enclosure 115 there is a coating mechanism 111 that is used to evenly spread the feedstock powder over the build platform 108. Situated at the opposite end of the build chamber is a catch bin 110 used to catch the overflow powder 124. A ventilation manifold 112 is used to circulate inert gas within chamber 115.

Above the build chamber enclosure 115 is the optical enclosure 113. A collimated light source 101 produces a collimated beam 118 that enters the optical enclosure 113. The beam is reflected by a primary mirror 102 and then reflected by a secondary mirror 103. A focussing lens 154 is mounted in the scan head 104 and produces a focused beam 119. The beam 119 then passes through an optically transparent window 114. The beam melts powder on the build plate 105 to produce a solidified 3D part 122.

Before operation a 3D CAD model may be generated in modelling software. This CAD model is exported as a .STL file and imported into the AM software. The AM software orients and slices the model according to processing parameters such as laser power, infill spacing, and scan speed. The AM software then generates a .gcode file that is then sent and interpreted by the AM machine.

The preparation of the machine involves several steps:
1. Loading the gcode to the onboard computer;
2. Filling the dispenser/feeder with feedstock powder 121;
3. Installing a clean build plate 105 and ensuring that it is level with the recoating mechanism and focal plane;
4. Checking and/or cleaning the optical components of debris;
5. Closing and securely sealing the build chamber enclosure 115;
6. Enabling the heated bed so that it may warm up the build plate 105 to an ideal processing temperature to reduce thermal stresses in the build;
7. Flooding the build chamber enclosure 115 and ventilation system with an inert gas such as Argon until the O2 limit within the chamber reads below the allowable limit;
8. Once the O2 limit is reached, the ventilation system can be powered on to remove weld spatter and particulates from the process by filtering and recycling the gas in the chamber;
9. Finally the build is ready to be initiated.

Once the build has been initiated, the AM machine begins executing the gcode commands.

The build process is made up of a succession of layer depositions that occur as follows:
1. The build plate 105 drops below the build plane by one layer height (approx. 10 to 100 microns);
2. The feeder dispenses powder 121 for the coating mechanism 111 to push across the build plane and the excess powder drops into the catch bin 110 on the other side;
3. The coating mechanism 111 returns to its original position as the build plate 105 and feeder drop a small distance to avoid being affected by the returning device;
4. The build plate 105 and feeder return to their original positions and the fusing process may begin;
5. The laser scan head 104 moves into its starting position and begins fusing the cross section of the layer as the laser begins irradiating and the head 104 begins to scan the patterns according to the gcode;
6. The laser scanner 104 will complete different types of patterns in order to achieve the types of part properties desired as is determined by the defined processing parameters;
7. Once the laser scanner 104 is finished with the layer it stops emitting radiation and the process repeats at step 1, but with a slightly new pattern based on the cross sectional geometry of the following layer.

The operator may monitor the build process with a camera that is mounted inside of the scanner and observes the process from a safe location.

The process will complete when the machine executes the gcode for every layer so that printing time estimates can be calculated and displayed on the user interface.

Once the process is complete, the build cools down and then the operator may remove the build by brushing away unused powder 123 and removing the build plate 105 from the build platform 108.

The parts are then ready for post-processing which may vary depending on build material. Some parts may be heat treated, hot-isostatically pressed (HIPed), and then removed from the build plate 105 by cutting or using some other process such as wire-EDM.

The build plate 105 must be resurfaced before being reused and the unused powder from the process must be sieved to remove agglomerates or otherwise non-ideal particles.

The parts are now ready for use or other types of post-process machining operations.

Figure 2:
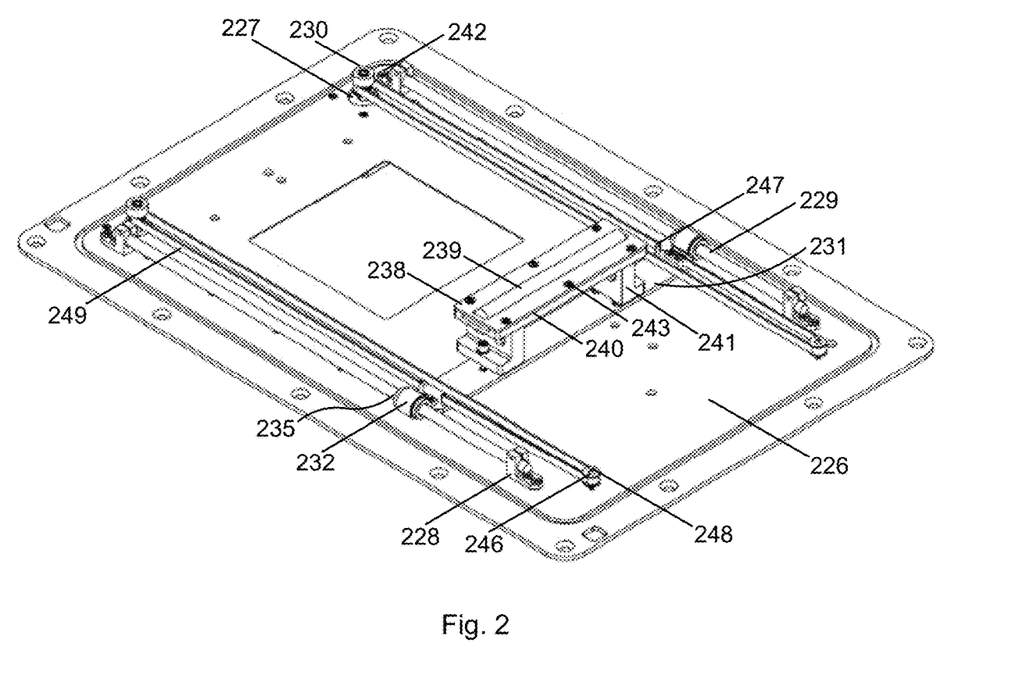
FIG. 2 illustrates a plan view of the recoater mechanism of the SLM device according to one embodiment of the present invention.

FIG. 2 illustrates a plan view of the recoater mechanism of an SLM device according to one embodiment of the present invention. The recoater mechanism of FIG. 2 will be explained in conjunction with the SLM device of FIG. 1. Four shaft mounts 228 are generally fixed to four corners of a base plate 226 using shaft mount screws 242. A guide shaft 229 generally runs between each pair of shaft mounts. A recoater base 231 is connected to both guide shafts 229 using a bearing mount 232 and a linear bearing 235 at either end of the recoater base 231. The recoater mechanism is moved by two drive belts 249. One drive belt is connected to each end of the recoater base 231 using a belt mount dowel pin 247. The drive belts 249 run parallel to the guide shafts 229, each round an idler pulley 246 and a drive pulley 230. The idler pulleys 246 are fixed to two corners of the base plate 226 with idler pulley screws 248. The drive pulleys 230 are fixed to the other two corners of the base plate 226 and are driven by two recoater drive motors 227. In use, the drive belts 249 move the recoater base 231 along the two guide shafts 229.

Two vertical supports 241 are generally fixed on top of the recoater base 231. A bulb holder (or a recoating member holder) 240 runs on top of the two vertical supports 241 between the vertical supports 241. A recoater bulb (or recoating member) 239 runs the length of the bulb holder 240 between the two vertical supports 241, and is situated in the bulb holder 240. There is a bulb clamp (or a recoating member claimp) 238 above the bulb 239, which holds the recoater bulb 239 in place. The bulb clamp 238 is attached to the bulb holder 240 using six bulb holder captive screws 243.

The recoater bulb 239 moves in a linear motion across the build surface of the SLM device. The build powder is pushed by the recoater bulb 239 from the feed cylinder 107 over the build cylinder 109, where it is spread over the build platform 108. The recoater mechanism then returns to its original position as the build platform 108 and feeder drop a small distance to avoid being affected by the returning recoater. In this way, layers of powder are spread incrementally over the build platform 108, which are then melted together using the laser scanner of the SLM device.

It will be appreciated that the recoater mechanism of the present invention is not limited to be used in SLM systems only, and may also be used in SLS systems.

Figure 3:
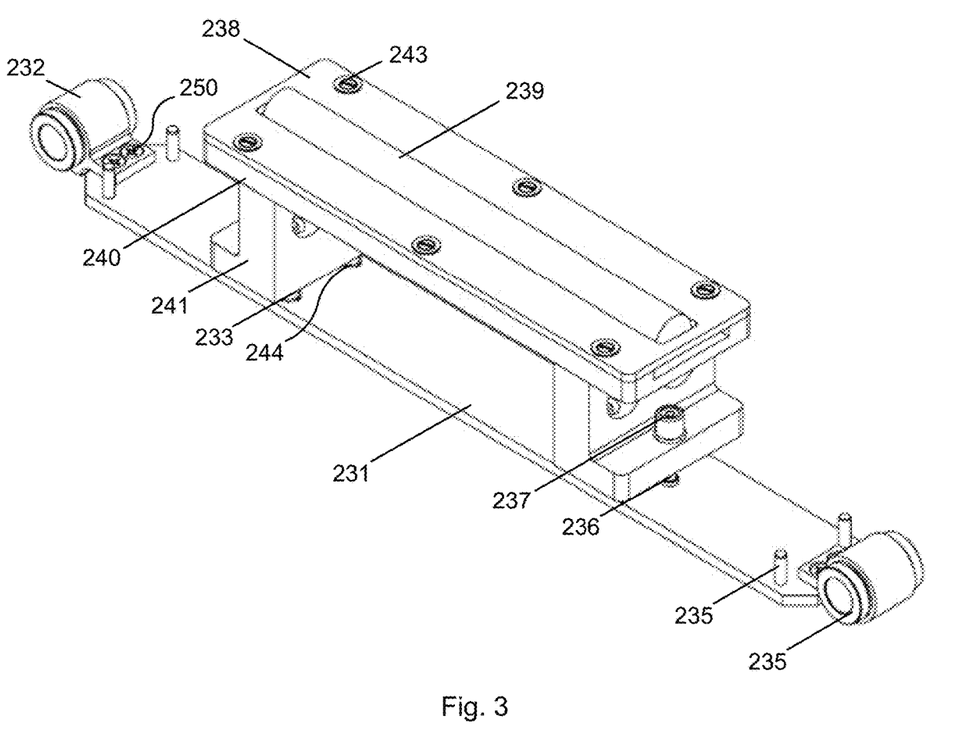
FIG. 3 illustrates a plan view of the portion of the recoater mechanism that is movable along the guide shafts by the drive belts, according to one embodiment of the present invention.

FIG. 3 illustrates a plan view of the portion of the recoater mechanism that is movable along the guide shafts by the drive belts, according to one embodiment of the present invention. Many of the features of FIG. 3 are similar to those shown in FIG. 2 and therefore carry the same reference numerals. The linear bearings 235 are held in place by the two bearing mounts 232, attached at either end of the recoater base 231 using the bearing mount screws 250. Two belt mount dowel pins 247 are situated next to each bearing mount 232.

Each of the two vertical supports 241 are fixed on top of the recoater base 231 using a vertical adjustment screw 237 through the vertical supports 241. Each vertical adjustment screw 237 runs through an adjustment screw bushing 236 between each vertical support 241 and recoater base 231. Each vertical support 241 is supported by two compression springs 244, each connected to a vertical adjustment shaft 233.

The bulb holder 240 is situated above the vertical supports 241 and the recoater bulb 239 runs the length of the bulb holder between the two vertical supports. The recoater bulb 239 is held in place by the bulb clamp 238 placed over the top of the recoater bulb 239. The bulb clamp 238 is secured using six bulb holder captive screws 243.

Figure 4:
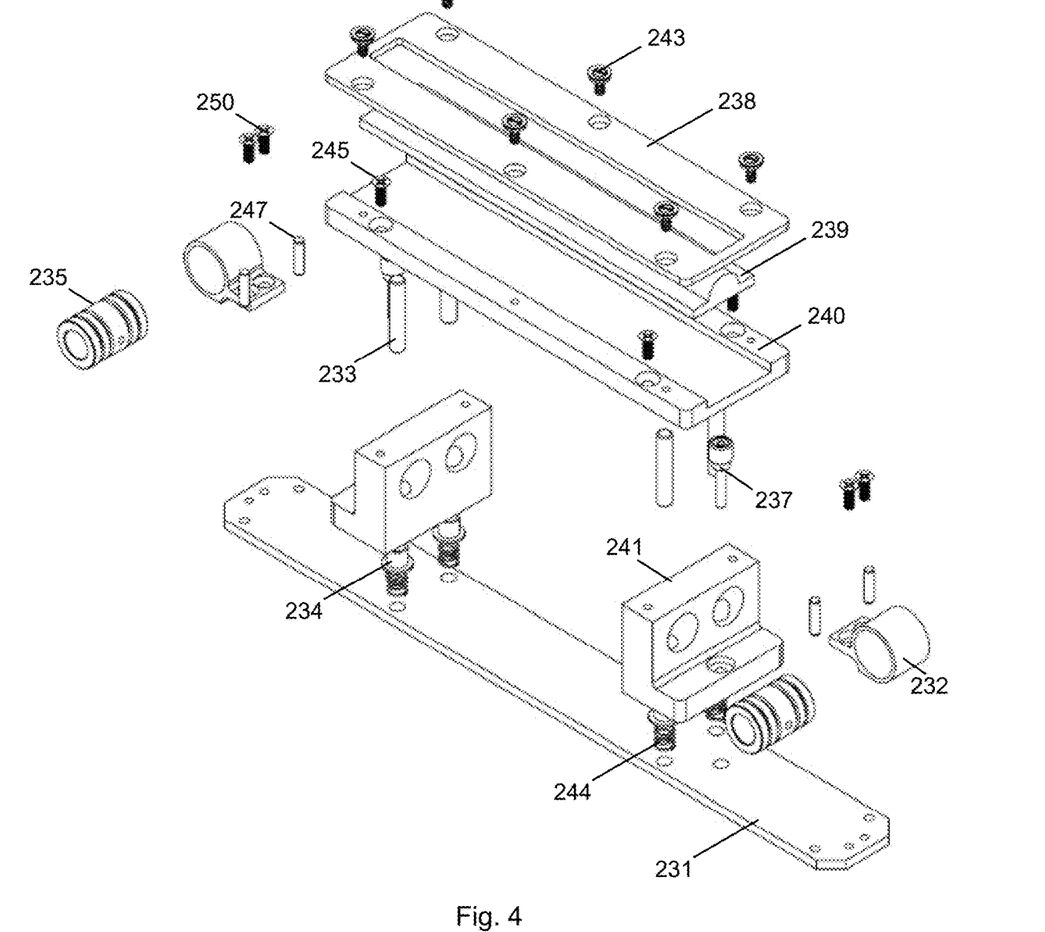
FIG. 4 illustrates an exploded view of the portion of the recoater mechanism that is movable along the guide shafts by the drive belts according to one embodiment of the present invention.

FIG. 4 illustrates an exploded view of the portion of the recoater mechanism that is movable along the guide shafts by the drive belts according to one embodiment of the present invention, expanded into its component parts. Many of the features are similar to those shown in FIG. 3 and therefore carry the same reference numerals. The vertical adjustment shafts 233 are held in place on the vertical supports 241 using adjustment shaft guides 234. In this view, it can be seen that the bulb holder 240 is connected to the vertical supports using four bulb holder screws 245.

Figure 5:
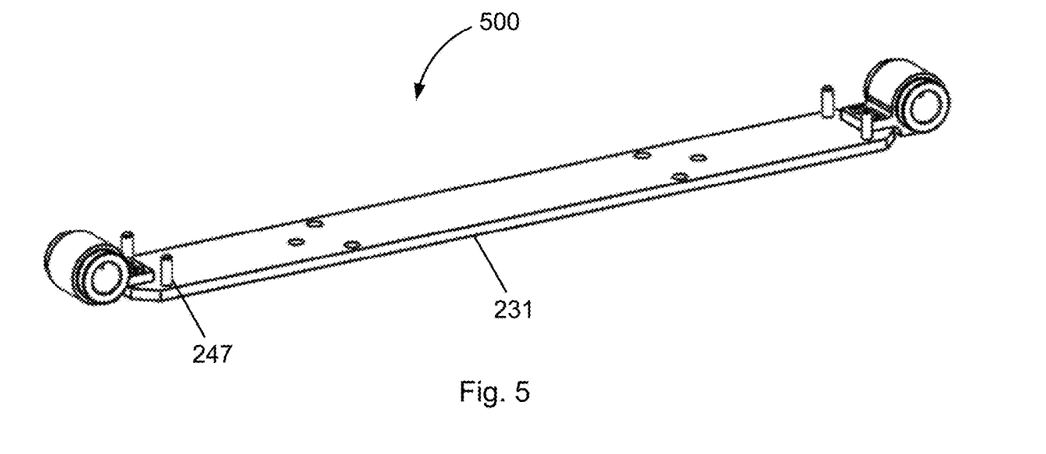
FIG. 5 illustrates a recoater bridge of the recoater device, according to one embodiment of the present invention.

FIG. 5 illustrates the recoater bridge of the recoater device, according to one embodiment of the present invention. Many of the features are similar to those shown in FIG. 3 and therefore carry the same reference numerals. The recoater bridge 500 includes the recoater base 231, the two bearing mounts 232 and the four dowel pins 247 for mounting the drive belts. The recoater bridge 500 is the component that mounts the recoater on the linear guides. The bulb holder mounts to the bridge via two adjustment screws and is fixed in place by four small guide shafts and compression springs.

Figure 6:
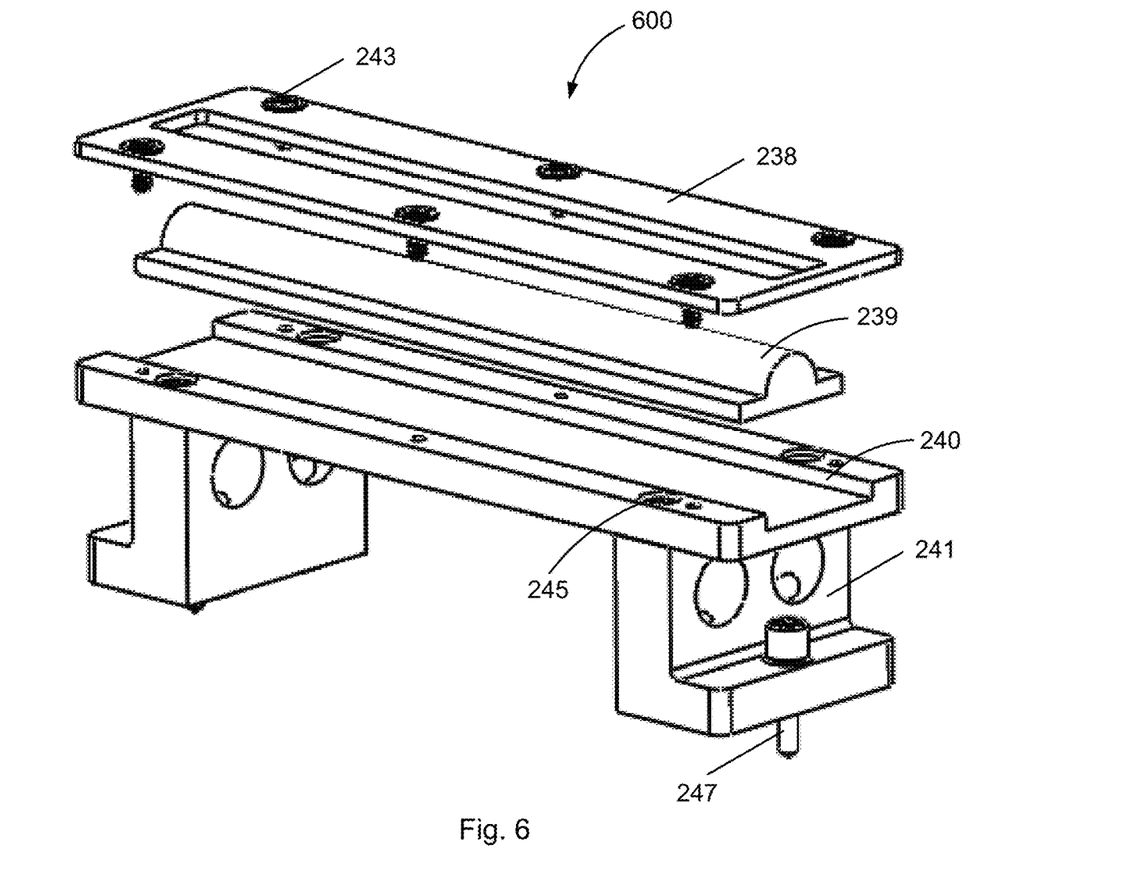
FIG. 6 illustrates a bulb holding portion of the recoater device, according to one embodiment of the present invention.

FIG. 6 illustrates the bulb holding portion of the recoater device, according to one embodiment of the present invention. Many of the features are similar to those shown in FIG. 3 and therefore carry the same reference numerals. The bulb holding portion 600 includes the two vertical supports 241 that mount the adjustment screws 237 and move on the guide shafts, the bulb holder 240 fixed using the bulb holder screws 245, and the bulb clamp 238 fixed using the bulb holder captive screws 243. The bulb holding portion 600 mounts the recoating bulb 239 in place, and allows it to be adjusted on the recoater bridge and to deflect when in use.

Figure 7:
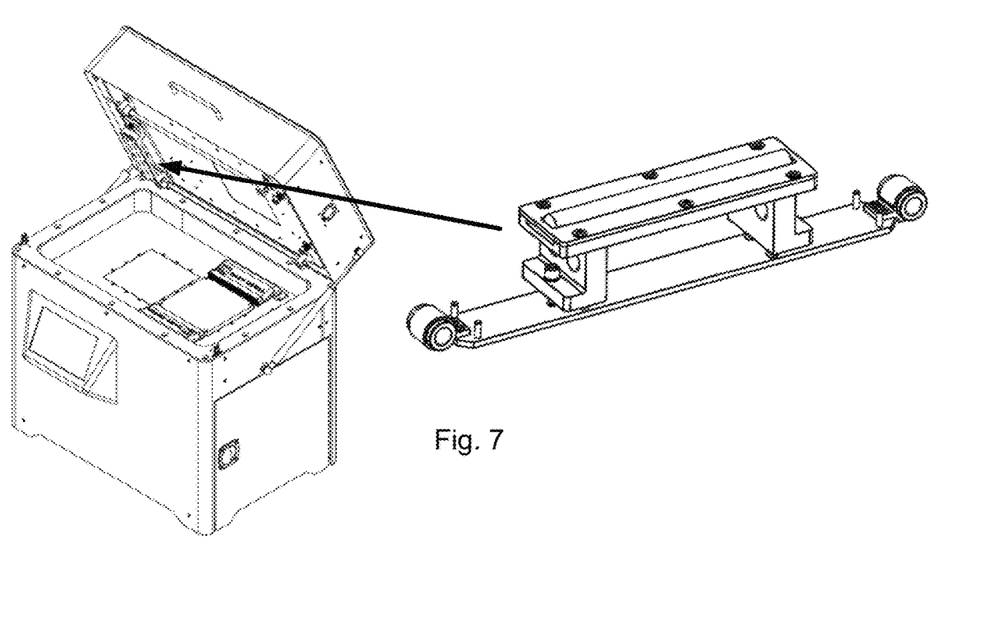
FIG. 7 illustrates a position of the recoating device within the XM200 demo model of a SLM machine.

FIG. 7 illustrates the position of the recoater within the XM200 demo model of a SLM machine.

Figure 8:
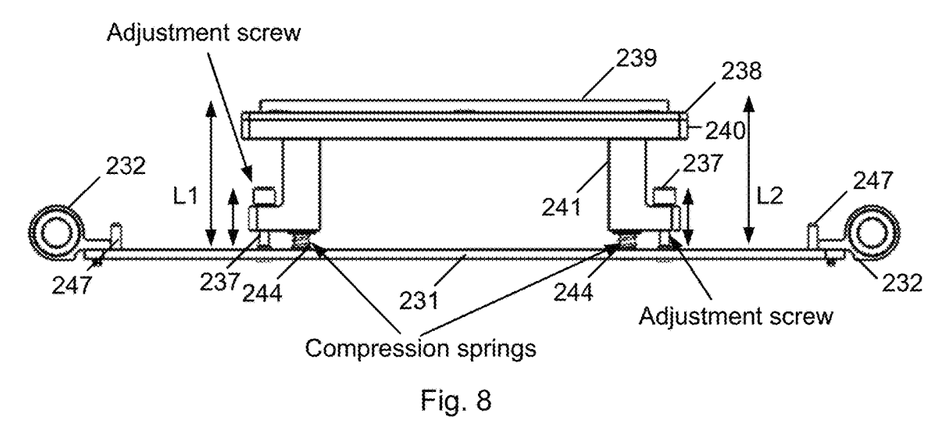
FIG. 8 illustrates a side view of the recoater bridge and a bulb holding portion of the recoating device, according to one embodiment of the invention.

FIG. 8 illustrates a side view of the recoater bridge and the bulb holding portion of the recoater device, according to one embodiment of the invention. Many of the features are similar to those shown in FIG. 3 and therefore carry the same reference numerals. An advantage of the recoater mechanism is the adjustability built into it. The recoater can be adjusted so it is perfectly aligned. The overall height can also be adjusted, allowing for a wider range of different layer thicknesses.

The two fine-thread adjustment screws 237 can be adjusted to raise and lower each end of the recoater, therefore changing L1 and L2 and adjusting the height of the recoater bulb 239. The adjustment screws 237 can be finger-adjusted or can also be adjusted with hex keys for extremely fine adjustment. The compression springs 244 fix the bulb holding portion in place on the recoater bridge.

Figure 9:
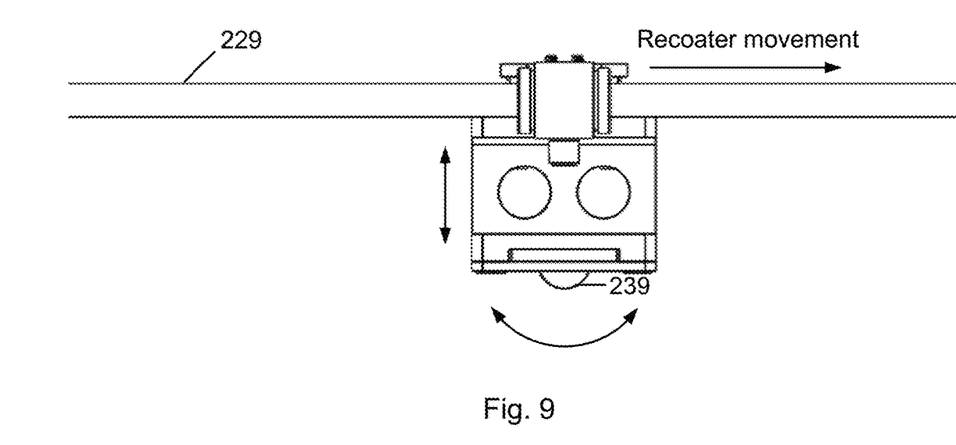
FIG. 9 illustrates an alternative side view of the recoating device when in use, according to one embodiment of the invention.

FIG. 9 illustrates an alternative side view of the recoater when in use, according to one embodiment of the invention. Many of the features are similar to those shown in FIG. 2 and therefore carry the same reference numerals. The recoater bridge is attached to the guide shaft 229 using the linear bearing and the bearing mount. In use, the recoater bridge and bulb holding portion are held below the guide shaft so that the recoater bulb 239 moves build powder across the top of the build plate of the SLM device.

The method of fixing the bulb holding portion in place using compression springs provides the advantage of compliance. The springs can compress which allows the recoater bulb 239 to flex and pivot. This compliance increases reliability in the process, since the recoater can interfere or "crash" on a slightly deformed part being formed, and recover. This reduces damage to both the recoater bulb and to the part being formed.

A non-compliant device under the same circumstances can damage the recoating bulb, or the part being formed, causing the process to fail. This then would require a re-start of the build which is costly and time-consuming. If the bulb is damaged it must be replaced with a new bulb. The compliance in the present invention reduces the frequency of replacing the recoater bulb in the system, which can be difficult and time-consuming.

Figure 10A:
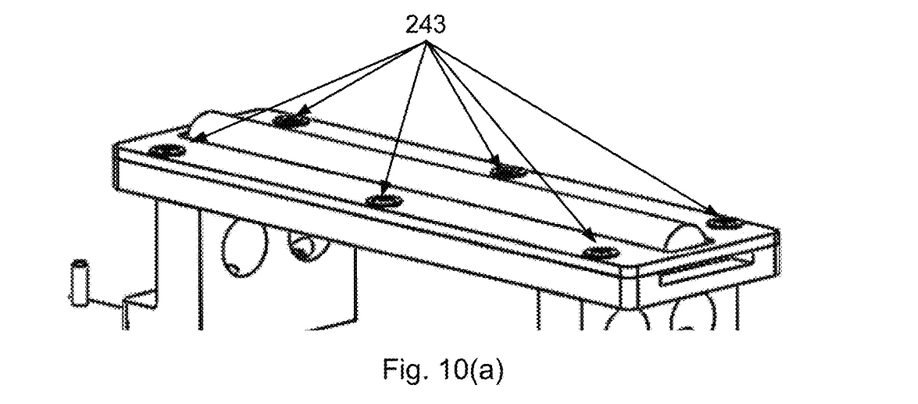
FIGS. 10(a)-10(c) illustrate a method of changing a recoater bulb in the recoater mechanism, according to one embodiment of the present invention.
Figure 10B:
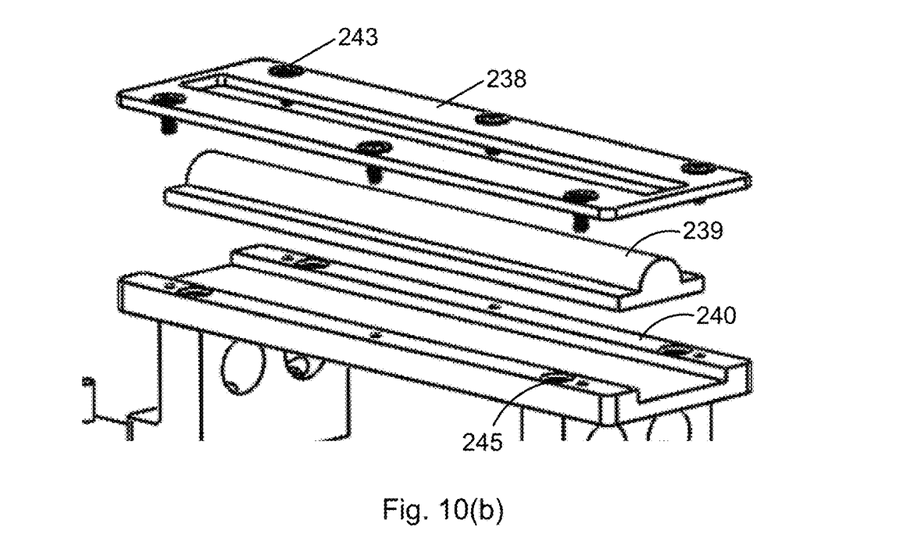
Figure 10C:
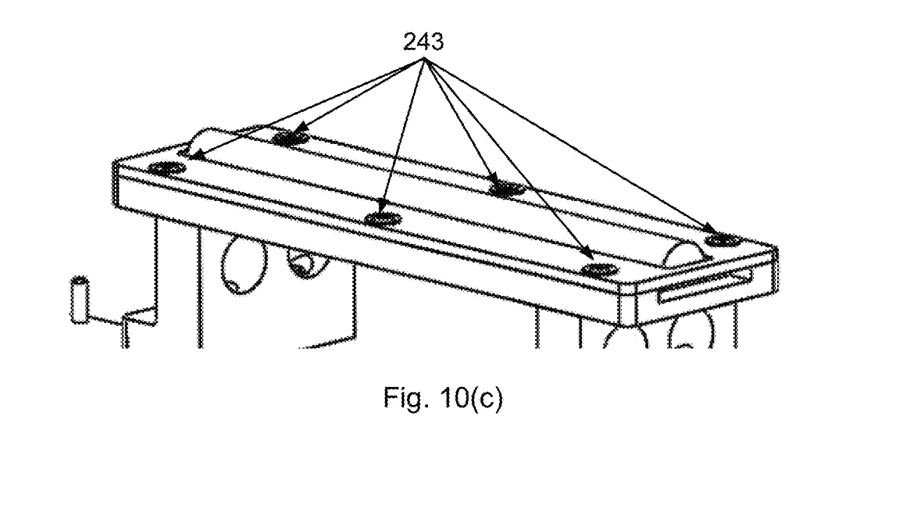

FIG. 10(a)-10(c) illustrate a method of changing the recoater bulb in the recoater mechanism, according to one embodiment of the present invention. Many of the features are similar to those shown in FIG. 3 and therefore carry the same reference numerals. FIG. 10(a) shows the six bulb holder captive screws 243 can be removed. As shown in FIG. 10(b), the bulb clamp 238 can then be removed, the bulb 239 is replaced. The bulb clamp 238 is then re-installed by replacing the bulb holder captive screws, as shown in FIG. 10(c). This allows the bulb to be easily changed. This requires the recoater mechanism to be mounted on the lid of the additive manufacturing machine in order to access the screws.

Figure 11A:
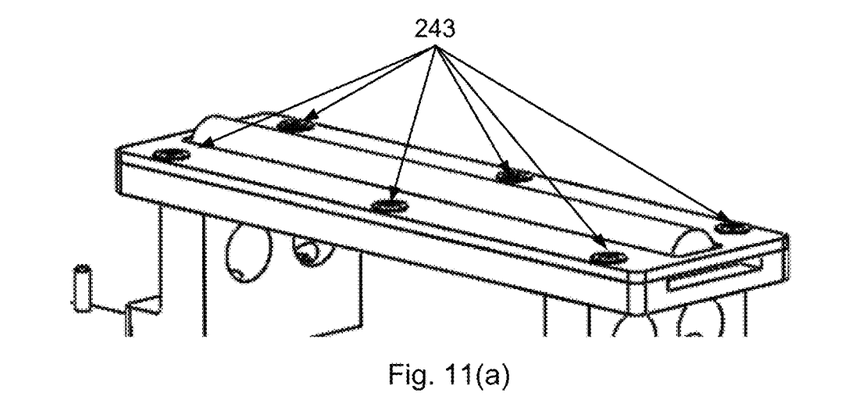
FIGS. 11(a)-11(c) illustrate an alternative method of changing the recoater bulb in the recoater mechanism, according to a further embodiment of the present invention.
Figure 11B:
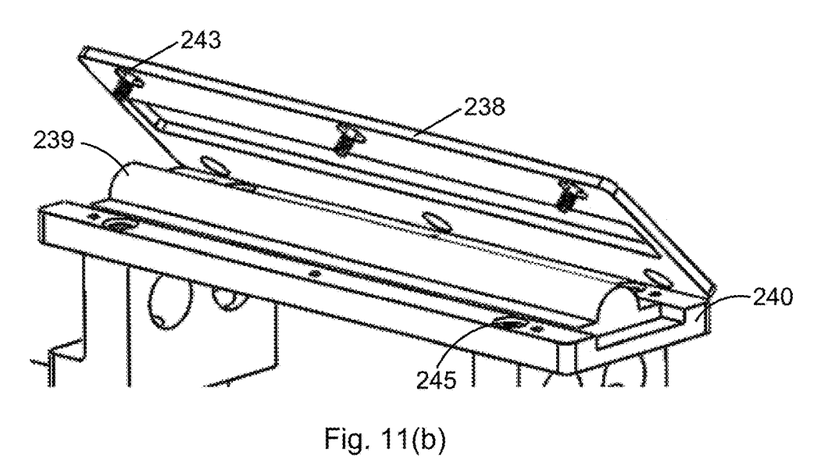
Figure 11C:
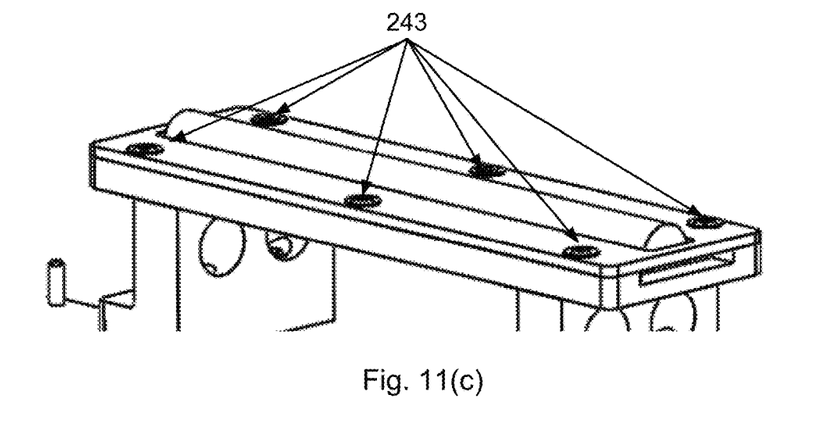

FIG. 11(a)-11(c) illustrate an alternative method of changing the recoater bulb in the recoater mechanism, according to a further embodiment of the present invention. Many of the features are similar to those shown in FIG. 3 and therefore carry the same reference numerals. FIG. 11(a) shows the six bulb holder captive screws 243 can be removed. The bulb clamp 238 is mounted on a hinge, allowing it to swing open instead of having to completely remove it, as shown in FIG. 11(b). The bulb 239 can then be replaced. The bulb clamp 238 is then reinstalled by replacing the bulb holder captive screws as shown in FIG. 11(c). This configuration also allows the bulb to be easily changed. Replacement of the bulb as shown in FIGS. 10(a)-10(c) and 11(a)-11(c) is easier and quicker than methods of replacement of the bulb in previous devices. The removal is not affected by the high coefficient of friction of the bulb, as the bulb does not have to be slid in and out. Additionally, the recoater device does not need to be taken out to access the bulb, instead only the bulb clamp needs to be moved to access the bulb.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A recoating device for an additive manufacturing process, the device comprising:
   a recoating member for guiding a volume of material to a target area;
   a support structure on which the recoating member is mounted;
   a recoater base coupled with the support structure; and
   at least one biasing component coupled between the recoater base and the support structure;
   wherein the recoating device is configured such that the recoating member moves in a first direction along a longitude of the target area and wherein the at least one biasing component is configured to move the recoating member in a second direction different to the first direction.

2. A recoating device according to claim 1, wherein the recoating member moves in the second direction when the recoating member pivots about an axis along the first direction.

3. A recoating device according to claim 1, wherein the recoating member moves in the second direction when the recoating member pivots about an axis transverse to the first direction.

4. A recoating device according to claim 1, further comprising at least one biasing component located at each end of the support structure and coupled between the recoater base and the support structure.

5. A recoating device according to claim 1, wherein the at least one biasing component is a compression spring.

6. A recoating device according to claim 1, further comprising at least one adjustable fixing component at each end of the support structure, the at least one adjustable fixing component each being coupled between the recoater base and the support structure.

7. A recoating device according to claim 6, wherein a height of the recoating member in relation to the target area is adjustable by the at least one fixing component.

8. A recoating device according to claim 6, wherein the at least one fixing component is a height adjustment screw.

9. A recoating device according to claim 6, wherein one end of the recoating member is raised or lowered independently to another end of the recoating member.

10. A recoating device according to claim 1, wherein the recoating member is a recoater bulb or a recoater blade.

11. A recoating device according to claim 1, further comprising a plurality of longitudinal rails, wherein the recoating member is movable along the plurality of longitudinal rails in the first direction.

12. A recoating device according to claim 1, further comprising:
   a recoating member holder coupled with the recoater base; and
   a recoating member clamp coupled with the recoater member holder;
   wherein edges of the recoating member are fixed between the recoating member holder and the recoating member clamp.

13. A recoating device according to claim 12, wherein the recoating member clamp is detachable from the recoating member holder, and optionally by the removal of one or more screws.

14. A recoating device according to claim 12, wherein the recoating member clamp is mounted onto the recoating member holder using a hinge, wherein the hinge is operable by the removal of one or more screws.

15. A recoater device according to claim 1, wherein the recoater member comprises rubber or plastic.

16. A three dimensional (3D) printer comprising the recoating device of claim 1.

17. A method of manufacturing a recoating device for an additive manufacturing process, the method comprising:
   forming a recoating member for guiding a volume of material to a target area;
   forming a support structure on which the recoating member is mounted;
   forming a recoater base coupled with the support structure; and
   forming at least one biasing component coupled between the recoater base and the support structure;
   wherein the recoating member moves in a first direction along a longitude of the target area and wherein the at least one biasing component is configured to move the recoating member in a second direction different to the first direction.

* * * * *